United States Patent Office 3,124,605
Patented Mar. 10, 1964

3,124,605
BIURET POLYISOCYANATES
Kuno Wagner, Leverkusen, Germany, assignor to Farbenfabriken Bayer Aktiengesellschaft, Leverkusen, Germany, a corporation of Germany
No Drawing. Filed Apr. 15, 1959, Ser. No. 806,444
Claims priority, application Germany Apr. 24, 1958
5 Claims. (Cl. 260—453)

This invention relates generally to organic polyisocyanates, and, more particularly, to novel organic polyisocyanates and to a method for making them.

It has been proposed heretofore to react an organic monoisocyanate with water to form an N-substituted carbamic acid derivative which upon further reaction with an isocyanate forms a urea derivative and carbon dioxide. Polyureas can also be prepared in this way by polyaddition.

It has also been proposed to prepare urea diisocyanates of low molecular weight and having the general formula OCN—R—NHCONH—R—NCO by reacting one mol of water in a solvent therefor with at least two mols of a diisocyanate at low temperatures of between 0° C. to about 30° C. Such a process is disclosed, for example, in U.S. Patent 2,757,184. As indicated in this patent, however, only isocyanates which have —NCO groups with different degrees of chemical reactivity, such as, for example, an alkyl substituted aromatic diisocyanate like 2,4-toluylene diisocyanate, can be used. It is also necessary to closely control the reaction conditions in order to produce a product which can be separated as a low molecular weight urea diisocyanate.

It is an object of this invention to provide novel polyisocyanates having improved physical characteristics. Another object of the invention is to provide a method for making a polyisocyanate having a relatively low vapor pressure and less toxic than the conventional monomeric polyisocyanates. Still another object of the invention is to provide organic polyisocyanates of relatively low molecular weight and prepared from an organic polyisocyanate which may or may not have —NCO groups of different degrees of reactivity. A still further object of the invention is to provide organic polyisocyanates of relatively low molecular weight capable of reacting with compounds containing active hydrogen atoms which are more soluble in organic solvents than urea diisocyanates.

The foregoing objects and others, which will become apparent from the following description, are accomplished in accordance with this invention, generally speaking, by providing low molecular weight organic polyisocyanates having a biuret structure. The biuret polyisocyanates provided by this invention can be represented by the following general formula

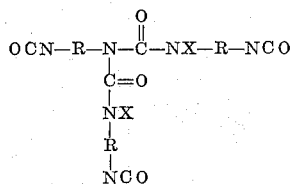

in which R is an aliphatic, hydroaromatic, araliphatic, including aralkyl, or an aromatic radical, which may or may not be substituted with halogen, such as, chlorine, $NO_2$, an alkyl radical, an alkoxy radical or the like. R should not contain any hydrogen atoms which are reactive with an —NCO group. X is either hydrogen or the grouping —CO—NX—R—NCO in which X has the same meaning. The novel polyisocyanates having the biuret structure may be prepared by reacting water with a monomeric organic diisocyanate in the ratio of 1 mol water to 3 mols diisocyanate or by reacting a monomeric organic diisocyanate with a urea diisocyanate of the formula

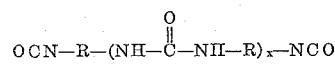

in which R is an aliphatic, hydroaromatic, araliphatic or an aromatic radical, which may or may not be substituted with halogen, such as, chlorine, an $NO_2$ group, an alkyl radical, an alkoxy radical or the like, and X is from 1 to 5. The reaction of the urea diisocyanate with the monomeric organic diisocyanate is preferably conducted at a temperature of from about 70° C. to about 200° C. The ratio of urea diisocyanate to monomeric organic diisocyanate is about 1 mol to about at least 1 mol, respectively. The alkyl radical on R in the above formulae may be a lower alkyl radical, such as, —$CH_3$, —$C_2H_4$, —$C_4H_9$, or the like. The alkoxy radical on R may be a lower alkoxy radical, such as —$CH_3O$, —$C_2H_4O$, —$C_3H_7O$, or the like. The organic polyisocyanates contemplated by this invention have only one —NCO group on each R and the total number of —NCO groups in the molecule, or the average total number of —NCO groups per molecule in case of a mixture of reaction products, does not exceed 6.

The biuret diisocyanates may be prepared by using water per se or water contained in a compound as water of crystallization or in statu nascendi. It is particularly desirable to use such water donors where it is desirable to use only small concentrations of water because it is easy to control the amount of water used in this way. These water donors are also advantageous when preparing biuret diisocyanates from a monomeric organic diisocyanate having —NCO groups of uniform activity, such as, for example, phenylene diisocyanate. Any suitable compound having water of crystallization or compounds which yield water in statu nascendi can be used, such as, for example, $Na_2SO_4 \cdot 7H_2O$, $Na_2SO_4 \cdot 10H_2O$,

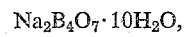

$Mg(NO_3)_2 \cdot 6H_2O$, $MgSO_4 \cdot 7H_2O$, $MgCl_2 \cdot 6H_2O$, oxalic acid, chlorhydrate, hydrates of alcohols, including pinacol hydrate and formaldehyde hydrates of low molecular weights, dicarboxylic acids which are easily changed into their anhydrides, including maleic acid, salicylic acid and the like. The salicylic acid does not form either a urethane or carbamide under the reaction conditions, but on the contrary, forms a polysilicylide. Still other compounds which yield water are xyleneformaldehyde resins or N-methylol compounds, including alpha, omega-N-methylol polymethylene ureas which split off water with an increase in molecular size and can be separated easily by filtration from a liquid in finely powdered form after the reaction has been completed. Xyleneformaldehyde resins have been described in detail in Angew. Chemie A 60 (1948), pages 88–96. They are easily prepared for example by condensing xylene with aqueous formaldehyde in the presence of diluted sulfuric acid.

Any suitable monomeric organic diisocyanate may be used, such as, for example, 1-methyl benzene 2,4-diisocyanate, 1-methyl benzene 2,6-diisocyanate, 1-methoxy benzene 2,4-diisocyanate, 1-chloro benzene 2,4-diisocyanate, diphenylmethane 4,4'-diisocyanate, para-phenylene diisocyanate, meta-phenylene diisocyanate, hexamethylene diisocyanate, cyclohexamethylene 1,4-diisocyanate, dicyclohexyl 4,4'-diisocyanate, mixtures thereof including an 80% 1-methyl benzene 2,4-diisocyanate, 20% 1-methyl benzene 2,6-diisocyanate mixture, alkyl, for example, —$CH_3$, —$C_2H_4$ or the like, substituted derivatives of the aforementioned diisocyanates, and the like.

The process provided by this invention may be carried out in a simple manner by reacting water as such as obtained from a donor compound or a urea diisocyanate with a monomeric organic diisocyanate at a temperature between about 70° C. and about 200° C. Most preferably the reaction is started at a temperature within the range of from about 85° C. to about 100° C. and the temperature is not permitted to exceed about 130° C. to about 140° C. during the reaction. It is preferred that the temperature be in the latter range at the end of the reaction. At least 3 mols of a monomeric organic diisocyanate are used for each mol of water and at least one mol of a monomeric organic diisocyanate is used for each mol of urea diisocyanate. The molecular weight of the product will vary with the length of the heating period and the proportions of the components but the —NCO number of the product will always be within the same general order.

In a preferred embodiment of the invention, relatively large excess of monomeric organic diisocyanate is used. In accordance with this process, the resulting biuret polyisocyanate is obtained as a solute in the excess monomeric organic diisocyanate. It has been found that sparingly soluble intermediate products, such as, for example, urea diisocyanates cannot be isolated at any time during the formation of the biuret polyisocyanates so these intermediates are believed to react with polyisocyanate to form more biuret polyisocyanate. It is possible to modify the biuret compounds by including in the reaction mixture a small quantity of a compound having hydrogen atoms reactive with an —NCO group, such as, for example, a polyhydric alcohol including ethylene glycol, trimethylol propane and the like, diphenyl urea, carboxylic acid amides, such as, adipamide, and the like, and phenyl butyl urea.

It has already been stated that by using the novel process, reaction products are obtained which have better solubility in organic solvents, such as, ethyl acetate, acetone, dioxane, aromatic hydrocarbon like benzene, toluene, xylene, and tetrahydrofuran, than the urea diisocyanates formed under gentle conditions from water and monomeric diisocyanates with —NCO groups of different reactivity. In addition, any desired diisocyanates can be used for the novel process, either those with non-uniform or those with uniform reactivity of the —NCO groups. As can be seen from the infra-red spectra of the products obtained by the process, these do not show either urethdione groupings or isocyanuric acid rings in the molecule. Therefore, no polymeric diisocyanates are formed in this process. Even when these substances are treated for a relatively long period with excess diisocyanates, urethdione groups or isocyanuric acid rings are not be detected to any appreciable degree. The products of the process must therefore have attributed thereto substantially the structure of a biuret polyisocyanate of the said formula, tetra-, penta- and hexa-isocyanates being formed by further addition of monomeric diisocyanates to the biuret configuration. They can be isolated as golden-yellow, pulverizable, dry resins from the solution of the monomeric diisocyanate used in excess by fractional precipitation or by separating by distillation.

The biuret polyisocyanates provided by this invention may be used as adhesives or in the preparation of a composition which will form a polyurethane coating, such as, for example, a composition containing a polyester and a biuret polyisocyanate. The biuret polyisocyanates may also be used to react with organic compounds having hydrogen atoms active with an —NCO group, such as, polyesters and polyalkylene ether glycols to form cellular polyurethanes or homogeneous non-porous polyurethanes. The cellular polyurethanes may be used for making sponges, insulation and the like.

In order to describe the invention more fully and to clarify further the description, the following are specific embodiments thereof.

*Example 1*

About 870 parts by weight of 1-methyl benzene 2,4-diisocyanate are heated to about 93° C. While stirring well, about 27 parts by weight of distilled water are slowly introduced dropwise over a period of about 5 hours. Initially, there is only very slight evolution of carbon dioxide, but with increasing addition of water and increasing formation of reaction products, the reaction of the water added dropwise takes place more quickly in that the reaction products cause a better distribution of the water. On completing the addition of water, he reaction mixture is a clear solution and it is only in the vapor space that minute quantities of sparingly soluble polyureas and polyurea isocyanates have formed. The temperature is raised to about 140° C. and kept at this temperature for about 3 hours. After the solution has cooled, it is separated from about 1.2 parts by weight of a sparingly soluble by-product and the excess 1-methyl benzene 2,4-diisocyanate is removed by vacuum distillation. The viscous melt is poured on to a support, allowed to cool and there is obtained a completely dry golden-yellow reaction product which can be easily powdered and, in contrast to the known urea dissocyanates, has excellent solubility in acetone, dioxane and tetrahydrofuran. Yield: about 600 parts by weight. The reaction proceeds quantitatively: about 5 parts by weight of water are removed by the $CO_2$ evolved and do not participate in the reaction.

According to analysis and molecular weight, the composition of a tri-N,N',N''-(3-isocyanato-4-methylphenyl)-biuret is attributed to the reaction product. Softening point about 96° C.–103° C. Analysis for $C_{27}H_{20}N_6O_5$— Calculated: C, 62.90%; H, 4.03%; N, 16.94%; O, 16.13%; percent NCO, 25.4%. Found: C, 62.97%; H, 4.24%; N, 17.20%; O, 15.91%; percent NCO, 26.0%. Molecular weight of triethyl urethane $C_{33}H_{38}N_6O_8$: Calculated 634, found 653 (in phenol).

If excess 1-methyl benzene 2,4-diisocyanate is not separated out, then without any stabilization of the more or less viscous solutions, storable solutions of tri-N,N',N''-(3-isocyanato-4-methylphenyl)-biuret are obtained. NCO content of the solution: 35.8%.

*Example 2*

The procedure is as in Example 1, but the water is added twice as quickly. The temperature is raised after adding the water to about 140° C., about another 348 parts by weight of 1-methyl benzene, 2,4-diisocyanate are added and, contrary to Example 1, this temperature is maintained for about 9 hours. The further procedure is then in accordance with Example 1 and a pulverizable product which is only slightly darker in color is obtained. Yield: about 700 parts by weight. Softening point about 99° C.–108° C. NCO content 25.3%. The ethyl urethane of the biuret polyisocyanate which is obtained has a molecular weight of 1200 in phenol. It has the same dissolving properties in acetone as the tri-N,N',N''-(isocyanato-4-methyl-phenyl)-biuret obtained in Example 1, as well as similarly good solubility in 1-methyl benzene 2,4-diisocyanate or its isomers.

Example 3

About 400 parts by weight of a powdered urea diisocyanate of the formula $$OCNC_6H_3(CH_3)NHCONHC_6H_3(CH_3)_xNCO$$

($x=1$), which is contaminated with about 30% of homologues ($x=2$ and 3), are introduced into about 1600 parts by weight of a mixture of approximately 70% of 1-methyl benzene 2,4-diisocyanate and approximately 30% of 1-methyl benzene 2,6-diisocyanate at a temperature of about 110° C.–125° C. The suspension is heated for some hours at about 140° C., whereupon complete dissolution eventually takes place. A viscous solution of a biuret polyisocyanate of good storage ability is obtained, this being a golden-yellow resin as in Example 1. If the reaction product is precipitated with petroleum ether, taken up several times in a small quantity of acetone and reprecipitated several times, a completely dry powdery product with a softening point of about 90° C.–108° C. is also obtained after removal of the solvent and precipitating agent. NCO content 23.3%.

Example 4

About 500 parts by weight of 4,4'-diphenylmethane diisocyanate are heated to about 93° C. and about 5 parts by weight of distilled water are slowly added dropwise while stirring well. Not even a trace of separation of sparingly soluble urea diisocyanates or polyurea diisocyanates is observed. After completing the addition of water, the temperature is kept for some hours at about 140° C. On cooling, there is first of all obtained a viscous mass which after a few days tends to crystallize and can again be melted to form a clear liquid. NCO content 29.4%.

Example 5

The procedure indicated in Example 1 is followed, but about 870 parts by weight of 1-methyl benzene 2,6-diisocyanate are used. After completing the addition of water and terminating the development of carbon dioxide, the reaction mixture is a clear solution. The temperature is raised to about 135° C. and it is allowed to cool after about 4 hours. After filtration, there is obtained a storable solution of biuret polyisocyanates. NCO content of the solution 36.8%.

Example 6

The procedure as in Example 1 is followed, but using about 1000 parts by weight of a mixture which consists of approximately 70% of 1-methyl benzene 2,4-diisocyanate and approximately 30% of 1-methyl benzene 2,6-diisocyanate. About 8.4 parts by weight of water are slowly introduced dropwise, so that about 2.8 liters of $CO_2$ per hour are liberated. The mixture is thereafter heated for approximately 3 to 4 hours at about 140° C. A storable solution is obtained with an NCO content of 44.7%.

Example 7

(a) About 100 parts by weight of a technical xylene-formaldehyde resin are incorporated by stirring at room temperature into about 900 parts by weight of 1-methyl benzene 2,4-diisocyanate and left after having completely dissolved. After standing for about 2 days, separation of approximately 39 parts by weight of N,N'-4-methyl-benzene urea-3,3'-diisocyanate takes place in an almost analytically pure form.

(b) If the procedure set out under (a) is followed, but at approximately 90° C., 100° C., 120° C., or 140° C., no separation of urea diisocyanates occurs, even after a storage period of months. A mixture of isocyanate-modified xylene-formaldehyde resins is obtained in addition to biuret polyisocyanates. NCO content of the solution is 43.05%.

Example 8

About 30 parts by weight of salicylic acid are introduced all at once into about 435 parts by weight of a mixture consisting of approximately 70% of 1-methyl benzene 2,4-diisocyanate and approximately 30% of 1-methyl benzene 2,6-diisocyanate. While stirring well, the temperature is raised in stages to approximately 80° C., 100° C., and about 110° C. to 120° C. Care is taken that the evolution of carbon dioxide is not too violent and the temperature is finally raised to about 130° C. to about 140° C. After about 8 to 10 hours, the evolution of carbon dioxide has ceased. A storable solution of polysalicylides and biuret polyisocyanates in excess toluylene diisocyanate is obtained. NCO content of the solution 43.26%.

Example 9

About 512 parts by weight of hexamethylene diisocyanates and about 39 parts by weight of salicylic acid are initially heated for about 3 hours at about 120° C. in a nitrogen atmosphere. When the reaction subsides, the temperature is raised to about 170° C. and the reaction is terminated after half an hour. A solution of polysalicylides and biuret polyisocyanates in hexamethylene diisocyanate is obtained. NCO content of the solution 39.06%.

Example 10

About 2122 parts by weight of a mixture consisting of approximately 70% of 1-methyl benzene 2,4-diisocyanate and approximately 30% of 1-methyl benzene 2,6-diisocyanate are heated to about 95° C. While stirring well, a solution of about 9 parts by weight of water in about 31 parts by weight of ethylene glycol is slowly added to the diisocyanate mixture. On completion of the main reaction, the temperature is kept for about 6 hours at about 140° C. A viscous solution is obtained which only after a relatively long time shows a tendency to deposit small quantities of sparingly soluble by-products. NCO content of the solution 42.4%.

Example 11

About 2560 grams (approximately 15.2 mols) of hexamethylene diisocyanate are mixed at about 97° C.–99° C. while stirring with about 56 grams (approximately 3.1 mols) of water during about 6 hours. A batch of about 2.3 cc. of water is added approximately every 15 minutes. When reaction starts, carbon dioxide evolution is slow. When approximately 2 to 3 hours have passed, about 460 cc. are evolved per minute. When addition of water has been completed, a small amount of polyurea has been formed. The temperature is increased to about 130° C.–140° C. After about 3 to 4 hours the cooled solution is filtered and about 18 to about 30 grams of insoluble polyurea are separated. The clear filtrated solution is freed from hexamethylene diisocyanate residues under partial vacuum of about 0.2 mm. Hg. The reaction product is viscous and clear. NCO content 20.79%, yield of biuret/polyisocyanate mixture about 1175 grams.

It is to be understood that any of the other diisocyanates indicated as suitable herein may be substituted for the one used in the foregoing examples to react with the water. It is also to be understood that the water used in the foregoing examples can be derived from any of the compounds having water of crystallization or forming water upon the formation of an anhydride. Moreover, the reaction conditions can be varied in accordance with the teachings herein.

Although the invention has been described in considerable detail in the foregoing for the purpose of illustration, it is to be understood that such detail is solely for this purpose and that variations can be made therein by those skilled in the art without departing from the spirit and scope of the invention except as it set forth in the claims.

What is claimed is:
1. A compound having not more than six —NCO groups and the formula:

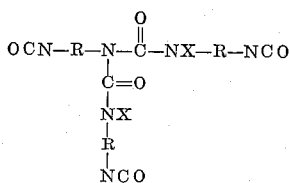

wherein X is selected from the group consisting of hydrogen and the grouping —CO—NX—R—NCO and R is the organic radical left after removal of the two —NCO groups from an organic diisocyante selected from the group consisting of cyclohexane diisocyanate, hexamethylene diisocyanate, phenylene diisocyanate, lower alkyl substituted phenylene diisocyanate, lower alkoxy phenylene diisocyanate, diphenylmethane diisocyanate, dicyclohexyl diisocyanate and chloro-substituted phenylene diisocyanate, said hydrogen being the only one on the compound which is reactive with an —NCO group.

2. The compound having the formula:

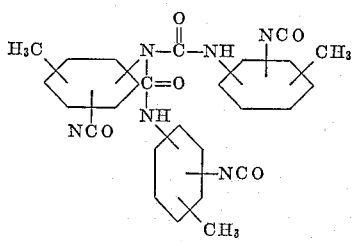

3. The compound having the formula:

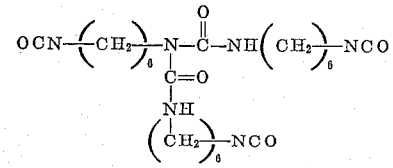

4. The compound having the formula:

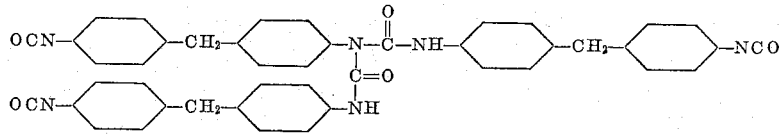

5. The compound having the formula:

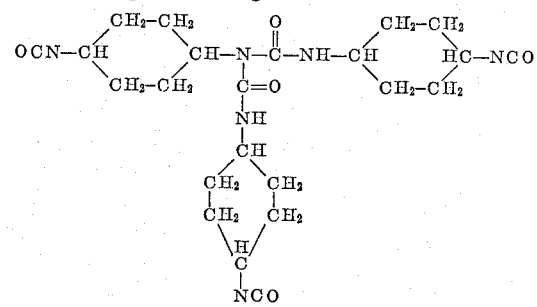

References Cited in the file of this patent
UNITED STATES PATENTS 2,597,025    Orth _____ May 20, 1952
2,757,185    Barthel _____ July 31, 1956

OTHER REFERENCES

Arnold et al.: Chemical Reviews, volume 57, Number 1, Feb. 1957, page 51.
Bergmann: "Actylene Chemistry," 1948, page 80.